US009219674B2

(12) United States Patent
Chowdiah et al.

(10) Patent No.: US 9,219,674 B2
(45) Date of Patent: Dec. 22, 2015

(54) PACKET DETECTION IN THE PRESENCE OF INTERFERERS

(71) Applicant: QUALCOMM Incorporated, San Diego, CA (US)

(72) Inventors: Vinayak N. Chowdiah, San Diego, CA (US); Gregory Alan Breit, Oakland, CA (US); David J. Walker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/028,398

(22) Filed: Sep. 16, 2013

(65) Prior Publication Data

US 2015/0078172 A1    Mar. 19, 2015

(51) Int. Cl.
*H04L 7/04* (2006.01)
*H04L 12/26* (2006.01)
*H04L 27/26* (2006.01)
*H04L 7/08* (2006.01)
*H04L 7/10* (2006.01)

(52) U.S. Cl.
CPC ............... *H04L 43/12* (2013.01); *H04L 7/042* (2013.01); *H04L 27/2656* (2013.01); *H04L 7/08* (2013.01); *H04L 7/10* (2013.01)

(58) Field of Classification Search
CPC .............. H04B 1/16; H04B 1/18; H04B 1/30; H04B 1/709; H04B 1/7093; H04B 1/7095; H04B 1/7115; H04B 1/7117; H04L 7/04; H04L 7/041; H04L 7/042; H04L 7/06; H04L 7/08; H04L 7/10; H04L 12/26; H04L 27/2646; H04L 27/2649; H04L 27/2655; H04L 27/2656; H04L 27/2662; H04L 43/12

USPC ......... 375/142–144, 148, 150, 152, 260, 343; 370/208, 210; 708/314, 422, 424–426
See application file for complete search history.

(56) References Cited

U.S. PATENT DOCUMENTS

| | | | |
|---|---|---|---|
| 7,480,234 B1 | 1/2009 | Hart et al. | |
| 7,697,593 B2 | 4/2010 | Nakao | |
| 8,306,160 B2 | 11/2012 | Takahashi et al. | |
| 2006/0002485 A1 | 1/2006 | Moher | |
| 2007/0147552 A1* | 6/2007 | Olesen et al. | 375/343 |
| 2007/0217524 A1* | 9/2007 | Wang et al. | 375/260 |
| 2008/0298223 A1* | 12/2008 | Chang et al. | 370/203 |
| 2009/0034652 A1* | 2/2009 | Song et al. | 375/296 |
| 2009/0304128 A1 | 12/2009 | Izumi et al. | |
| 2012/0207232 A1 | 8/2012 | Zhang et al. | |
| 2013/0094619 A1 | 4/2013 | Shellhammer et al. | |
| 2013/0136198 A1* | 5/2013 | Chavali et al. | 375/260 |
| 2013/0215993 A1* | 8/2013 | Taghavi Nasrabadi et al. | H04L 27/2601 375/295 |
| 2014/0087751 A1* | 3/2014 | Do et al. | 455/456.1 |

OTHER PUBLICATIONS

International Search Report and Written Opinion—PCT/US2014/055362—ISA/EPO—Dec. 18, 2014.

* cited by examiner

*Primary Examiner* — Young T Tse
(74) *Attorney, Agent, or Firm* — Arent Fox LLP

(57) ABSTRACT

Methods and apparatus for signal processing is disclosed. The methods and apparatus include a first autocorrelator configured to autocorrelate a received signal using a first time delay to produce a first correlation magnitude, a second autocorrelator configured to autocorrelate the received signal using a second time delay different from the first time delay to produce a second correlation magnitude, and a detector configured to determine whether the received signal comprises a packet preamble based on the first and second correlation magnitudes.

26 Claims, 13 Drawing Sheets

PACKET DETECTION IN THE PRESENCE OF INTERFERERS

BACKGROUND

1. Field

The present disclosure relates generally to communication systems, and more particularly, to methods and apparatuses for packet detection.

2. Introduction

Wireless networks are widely deployed to provide various services to consumers, such as telephony, data, video, audio, messaging, broadcasts, and the like. Today, wireless networks enable broadband communications over broad geographic regions (e.g., metropolitan, regional, nationwide, or even global), as well as more localized and personalized regions. Wireless networks covering local regions have become increasing pervasive in recent years. These wireless networks are often referred to as Wireless Local Area Networks (WLANs) which have been standardized, by way of example, by the Institute of Electrical Engineers (IEEE) 802.11 committee. WLANs are deployed to cover small areas with a geographic coverage ranging from a few tens of meters to a few hundred meters. A WLAN uses unlicensed spectrum to provide access to a network, typically covering only the network operator's own property. By way of example, many homes, office buildings, campuses, hotels, transportation hubs (e.g., airports, train stations, etc.) and other facilities contain WLAN access points to the Internet.

With any wireless network, a wireless receiver must be able to detect the transmission of data packets from a wireless transmitter in the presence of noise, interference and other disturbances in the wireless channel. In IEEE 802.11 compliant networks, for example, this may be achieved by detecting at the receiver a repeating pattern in the preamble of the data packet. Typically, this is achieved by means of an autocorrelation process. However, the standard autocorrelator has the disadvantage that it triggers on any type of periodic waveform, such as, by way of example, a single tone interferer within the bandwidth of interest. Even if the interferer power is relatively low, the effect of the Automatic Gain Control (AGC) in addition to the Signal-to-Noise Ratio (SNR) gain in the autocorrelator can lead to a significant number of false alarms. This can have several detrimental effects such as flooding the receiver with false detects, which may cause an increase in packet loss. The receiver may also experience an increase in its buffer requirements to account for the large number of false alarms, as well as an increase in power consumption to process false detected packets down the receiver chain.

Accordingly, systems and methods for packet detection in wireless networks are needed.

SUMMARY

Aspects of the present disclosure relate to an apparatus for signal processing. The apparatus includes a first autocorrelator configured to autocorrelate a received signal using a first time delay to produce a first correlation magnitude, a second autocorrelator configured to autocorrelate the received signal using a second time delay different from the first time delay to produce a second correlation magnitude, and a detector configured to determine whether the received signal comprises a packet preamble based on the first and second correlation magnitudes.

Aspects of the present disclosure relate to an apparatus for signal processing. The apparatus includes means for autocorrelating a received signal using a first time delay to produce a first correlation magnitude, means for autocorrelating the received signal using a second time delay different from the first time delay to produce a second correlation magnitude, and detector means for determining whether the received signal comprises a packet preamble based on the first and second correlation magnitudes.

Aspects of the present disclosure relate to a method of signal processing. The method includes autocorrelating a received signal using a first time delay to produce a first correlation magnitude, autocorrelating the received signal using a second time delay different from the first time delay to produce a second correlation magnitude, and determining whether the received signal comprises a packet preamble based on the first and second correlation magnitudes.

Aspects of the present disclosure relate to a computer program product for signal processing, comprising a machine-readable medium having instructions executable to autocorrelate a received signal using a first time delay to produce a first correlation magnitude, autocorrelate the received signal using a second time delay different from the first time delay to produce a second correlation magnitude, and determine whether the received signal comprises a packet preamble based on the first and second correlation magnitudes.

Aspects of the present disclosure relate to a wireless node. The wireless node includes a receiver configured to receive a signal, and a processing system. The processing system includes a first autocorrelator configured to autocorrelate the received signal using a first time delay to produce a first correlation magnitude, a second autocorrelator configured to autocorrelate the received signal using a second time delay different from the first time delay to produce a second correlation magnitude, and a detector configured to determine whether the received signal comprises a packet preamble based on the first and second correlation magnitudes.

It will be understood that other aspects of methods and apparatuses will become readily apparent to those skilled in the art from the following disclosure, wherein it is shown and described only several embodiments of the methods and apparatuses by way of illustration. As will be realized by those skilled in the art, the methods and apparatuses are capable of other and different embodiments and its several details are capable of modification in various other respects, all without departing from the spirit and scope of this disclosure. Accordingly, the drawings and detailed description are to be regarded as illustrative in nature and not as restrictive.

BRIEF DESCRIPTION OF THE DRAWINGS

Various aspects of methods and apparatuses will now be presented in the detailed description by way of example, and not by way of limitation, with reference to the accompanying drawings, wherein.

Figure 1:
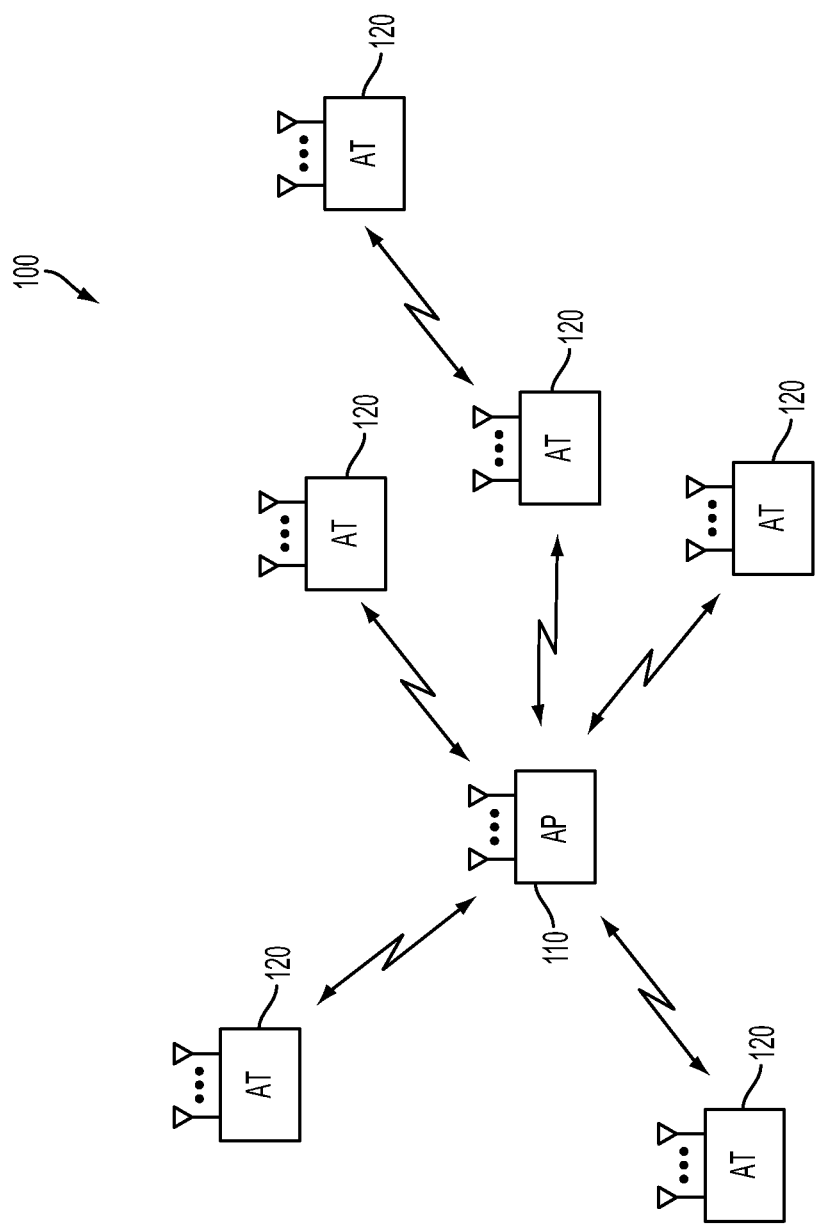
FIG. 1 is a conceptual diagram illustrating an example of a wireless network.

In accordance with common practice, some of the drawings may be simplified for clarity. Thus, well-known structures and components may be shown in block diagram form, or omitted entirely, in order to avoid obscuring the various concepts presented throughout this disclosure.

DETAILED DESCRIPTION

Various aspects of methods and apparatuses are described more fully hereinafter with reference to the accompanying drawings. These methods and apparatuses may, however, be embodied in many different forms and should not be construed as limited to any specific structure or function presented throughout this disclosure. Rather, these aspects are provided so that this disclosure will be thorough and complete, and will fully convey the scope of these methods and apparatuses to those skilled in the art. Based on the descriptions herein teachings herein one skilled in the art should appreciate that that the scope of the disclosure is intended to cover any aspect of the methods and apparatuses disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure herein may be embodied by one or more elements of a claim.

Although particular aspects of methods and apparatuses are described herein, many variations and permutations of these aspects fall within the scope of the disclosure. Although some benefits and advantages of such aspects may be mentioned, the scope of the disclosure is not intended to be limited to particular benefits, uses, or objectives. Rather, all aspects presented throughout this disclosure are intended to be broadly applicable to different wireless technologies, system configurations, networks, and transmission protocols, some of which are illustrated by way of example in the figures and in the following detailed description. Accordingly, the detailed description and drawings are merely illustrative of various methods and apparatuses rather than limiting, the scope of the disclosure being defined by the appended claims and equivalents thereof.

Several aspects of methods and apparatuses will be presented in the context of a wireless local area network (WLAN). A WLAN may be used to provide wireless connectivity and efficient data transfer employing widely used networking protocols. The various aspects described herein may apply to Wi-Fi or, more generally, any member of the IEEE 802.11 family of wireless protocols. By way of example, the various aspects described herein may be used to support the IEEE 802.11ah protocol. The IEEE 802.11ah protocol is a network protocol operating in the sub-1-GHz frequency range (e.g., operating in the 902-928 MHz range in the United States), which provides greater wireless range than other IEEE 802.11 protocols. However, as those skilled in the art will readily appreciate, such aspects may be extended to other wireless networks, such as wireless wide area networks (WWANs), wireless personal area networks (WPANs), or any other suitable wireless network regardless of its geographic reach or network protocol. According any reference to an IEEE 802.11 network is intended only to illustrate various aspects of methods and apparatuses, with the understanding that such aspects may have a wide range of applications.

FIG. 1 is a conceptual diagram illustrating an example of a wireless network 100 in which various aspects of the methods and apparatuses described herein may be employed. The wireless network 100 is shown with several wireless nodes, generally designated as nodes 110 and 120. A wireless node shall be construed broadly to include an access point and an access terminal. Each wireless node is capable of receiving and/or transmitting. In the detailed description that follows, the term "access point" is used to designate a transmitting wireless node and the term "access terminal" is used to designate a receiving wireless node for downlink communications, whereas the term "access point" is used to designate a receiving wireless node and the term "access terminal" is used to designate a transmitting wireless node for uplink communications. However, those skilled in the art will readily understand that other terminology or nomenclature may be used for an access point and/or access terminal. By way of example, an access point may be referred to as a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other suitable terminology. An access terminal may be referred to as a subscriber station, a subscriber unit, a mobile station (MS), a remote station, a remote terminal, a user terminal (UT), a user agent, a user device, user equipment (UE), a user station, or some other terminology. The various concepts described throughout this disclosure are intended to apply to all suitable wireless nodes regardless of their specific nomenclature.

The wireless network 100 may support any number of access points distributed throughout a geographic region to provide coverage for access terminals 120. For simplicity, one access point 110 is shown. An access point is generally a fixed terminal that provides backhaul services to access terminals in a geographic coverage region, however, the access point may provide a relay function to another access point that provides backhaul services. An access terminal, which may be fixed or mobile, utilizes the backhaul services of an access point or engages in peer-to-peer communications with other access terminals. Examples of access terminals include a cellular telephone, cordless telephone, session initiation protocol ("SIP") phone, a wireless local loop ("WLL") station, a personal digital assistant ("PDA"), a handheld device having wireless connection capability, or some other suitable processing device connected to a wireless modem. Accordingly, various aspect presented herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The wireless nodes operating in the wireless network 100 may use any suitable multiple access technology to gain access to the wireless channel. Examples include Code Division Multiple Access (CDMA), Time Division Multiple Access (TDMA), Frequency Division Multiple Access (FDMA), Spatial Division Multiple Access (SDMA), Orthogonal Frequency Division Multiple Access (OFDMA), Single-Carrier Frequency Division Multiple Access (SC-FDMA) systems, Carrier Sense Multiple Access (CSMA), or any combination thereof, or any other suitable wireless technology that enable multiple wireless nodes to share a wireless channel.

The format of the data transmitted by the wireless nodes 100 may take on various forms depending on the particular air interface standard being used and the wireless protocol required by that standard. By way of example, in IEEE 802.11 ah compliant networks, the wireless nodes are configured to transmit data in the form of packets with each data packet containing a series of Orthogonal Frequency Division Multiplexing (OFDM) symbols. OFDM, in addition to being a multiple access technology as indicated earlier, may also be used as a digital modulation technology.

Figure 2:
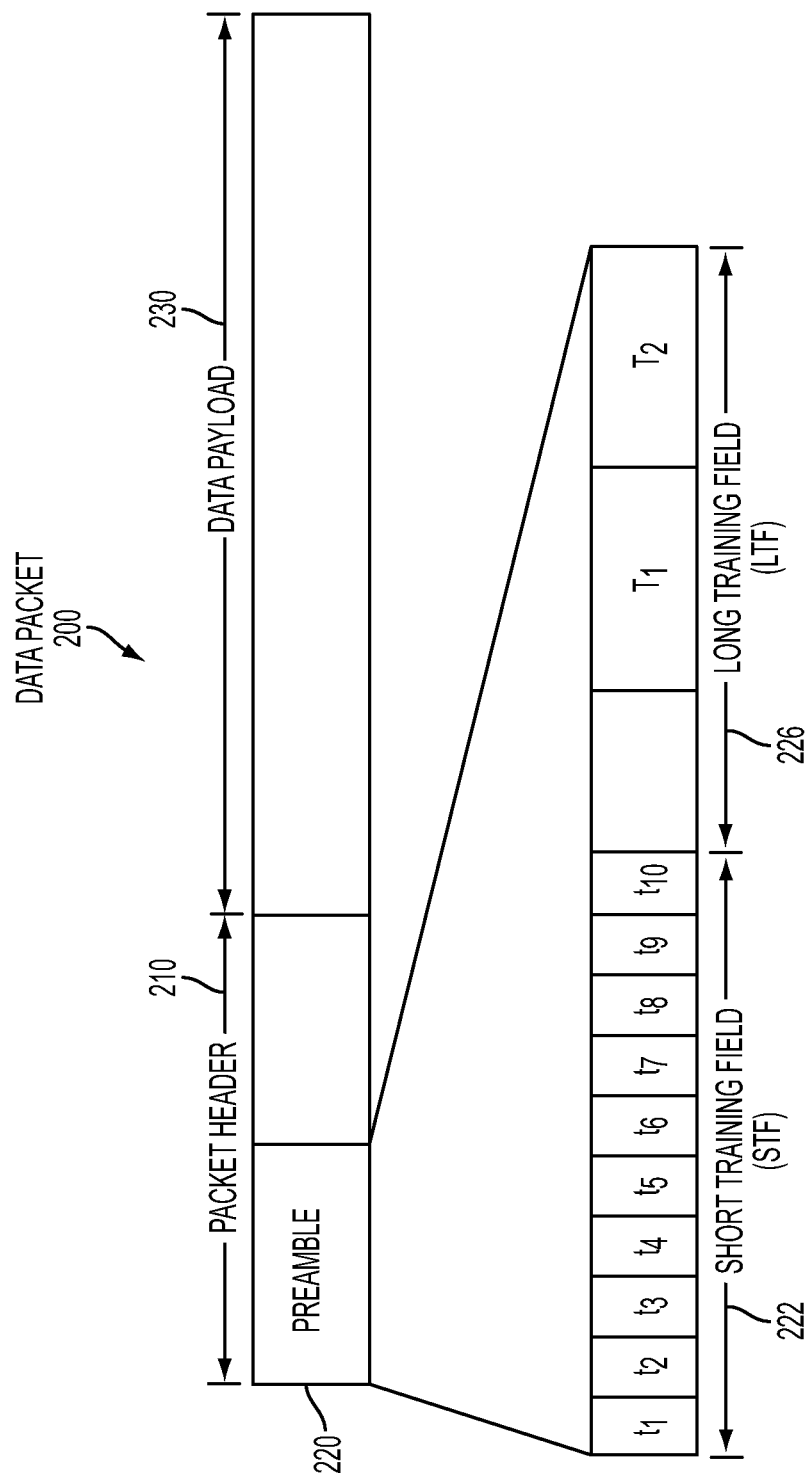
FIG. 2 is a conceptual diagram illustrating an example of a data packet format.

FIG. 2 is a conceptual diagram illustrating an example of a data packet format. The data packet 200 includes a packet header 210 followed by a data payload 230. The packet header 210 includes a preamble 220 at the start of every data packet. The preamble 220 includes a short training field (STF) 222 and a long training field (LTF) 226. The STF 222 includes ten repeated short OFDM symbols $t_1$ to $t_{10}$, each which is 0.8 μs. The LTF 226 includes two repeated long OFDM symbols $T_1$ and $T_2$, each which is 3.2 μs including a 1.6-μs prefix which precedes the LTF 226. The preamble is used by the receiving node for packet detection, setting the AGC level, timing recovery, carrier frequency offset correction, and channel estimation. The preamble is followed by other header information useful for processing the data packet including rate and data packet length information.

Figure 3:
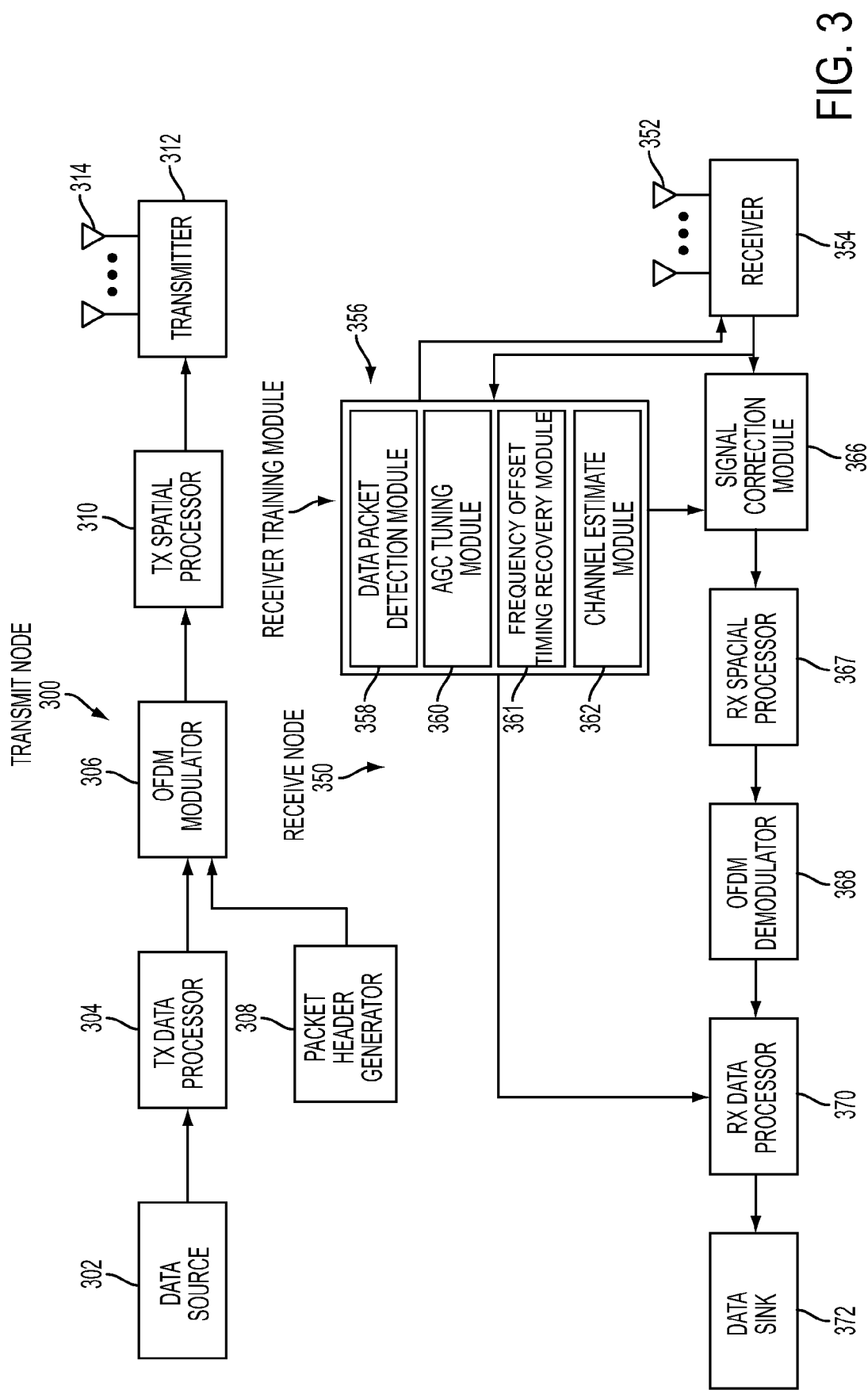
FIG. 3 is a functional block diagram illustrating an example of a transmit node in communication with a receive node in a wireless network.

FIG. 3 is a functional block diagram illustrating an example of a transmit node in communication with a receive node in a wireless network. As those skilled in the art will readily appreciate, the transmit node 300 may be capable of receiving and the receive node 350 may be capable of transmitting. For clarity, the transmit node 300 is shown with a transmit channel, but may also have a receive channel that is not shown. Similarly, the receive node 350 is shown with a receive channel, but may also have a transmit channel that is not shown.

The transmit node 300 is shown with a transmit (TX) data processor 304, which may be used to receive data from a data source 302 and encode (e.g., Turbo code) the data to facilitate forward error correction (FEC) at the receive node 350. The encoding process results in a sequence of code symbols that may be blocked together and mapped to a signal constellation by the TX data processor 304 to produce a sequence of modulation symbols.

The modulation symbols from the TX data processor 304 may be provided to an OFDM modulator 306. The OFDM modulator 306 splits the modulation symbols into a number of parallel streams and then maps each stream to a subcarrier. An Inverse Fast Fourier Transform (IFFT) is then performed on each set of subcarriers to produce time domain OFDM symbols, with each OFDM symbol having a set of subcarriers.

Similarly, header data from a packet header generator 308 is provided to the OFDM modulator 306. The OFDM modulator 306 splits the header data into a number of parallel streams, and then maps each stream to a subcarrier. An IFFT is then performed on each set of subcarriers to produce one or more time domain OFDM symbols which constitutes the packet header.

The data packet is formed with OFDM symbols carrying the packet header followed by OFDM symbols carrying the payload.

In one embodiment of a transmit node 300, a TX spatial processor 310 may be used to provide spatial processing for data packets in a Multiple Input Multiple Output (MIMO) antenna system. Multiple antennas at the transmit node 300 may be used to communicate with multiple antennas at the receive node 350 to improve data throughput without additional bandwidth or transmit power. This may be accomplished by spatially precoding the data packets into a number of spatially precoded streams, and then providing each spatially precoded stream to a different antenna 314 via a transmitter 312.

The receive node 350 includes a receiver 354. The receiver 354 receives the RF signal through multiple antennas 352 and provides RF signal processing functions to recover data packets from the carrier and provide digital baseband samples to a receiver training module 356.

The receiver training module 356 may be used to process the preamble transmitted with each data packet. The receiver training module unit 356 may be comprised of several modules working together to train the receive node 350. These modules include a data packet detection module 358, an AGC tuning module 360, a frequency offset/timing recovery module 360, and a channel estimate module 362. In a manner to be described in greater detail later, the data packet detection module 358 performs an autocorrelation process on the STF to detect valid packets. The STF is also used by the AGC tuning module 360 to adjust the AGC in the receiver 354. The frequency offset/timing recovery module 361 uses the STF and the LTF to coarsely and finely correct for frequency offsets and timing errors in the OFDM symbols via a signal correction module 366. The LTF is also used by the channel estimate module 364 to estimate the channel response to assist the RX data processor 370 downstream.

A RX spatial processor 367 may be used to provide spatial decoding in embodiments employing MIMO antenna systems. The spatially decoded OFDM symbols may be provided by the RX spatial processor 367 to an OFDM demodulator 368.

The OFDM demodulator 368 recovers the data carried on each subcarrier in the OFDM symbols in the payload and multiplexes the data into a stream of modulation symbols. The OFDM demodulator 368 converts the stream from the time-domain to the frequency domain using a Fast Fourier Transfer (FFT).

A RX data processor 370 is used to translate the modulation symbols back to the correct point in the signal constellation. Because of noise and other disturbances in the wireless channel, the modulation symbols may not correspond to an exact location of a point in the original signal constellation. Using the channel response from the channel estimate module 364, the RX data processor 370 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 370 then uses the sequence of code symbol LLRs in order to decode the data that was originally transmitted before providing the data to a data sink 372.

Several examples of a data packet detection module will now be presented. The data packet module may include a first autocorrelator configured to autocorrelate a received signal using a first time delay to produce a first correlation magnitude, a second autocorrelator configured to autocorrelate the received signal using a second time delay to produce a second correlation magnitude, and a detector configured to determine whether the received signal comprises a packet preamble based on the first and second correlation magnitudes. In some embodiments, a third autocorrelator may be added. In these embodiments, the third autocorrelator may be configured to autocorrelate the received signal using a third time delay to produce a third correlation magnitude, and the detector may be further configured to determine whether the received signal comprises a packet preamble based on the first, second and third correlation magnitudes. An autocorrelator is a device that correlates a signal with a delayed version of itself. It is typically used to detect repeating patterns in a waveform. The implementation of the autocorrelator is well known in the art, and thus those skilled in the art will be able to readily construct a suitable autocorrelator for data packet detection in accordance with the teachings herein.

As described above, a detector may be used to determine whether the received signal comprises a packet preamble based on correlation magnitudes generated by multiple autocorrelators. In some embodiments, the detector may be configured to make this determination by comparing the each correlation magnitude to a threshold. By way of example, the detector may be configured to determine that the received signal contains a packet preamble when the correlation magnitude from one autocorrelator "exceeds a threshold" and the correlation magnitude from another autocorrelator is "below a threshold" (i.e., a null space). The phrase "exceeds a threshold," or any variant thereof, is used throughout this disclosure merely to indicate that the correlation of the received signal is sufficiently high to indicate the possible presence of a packet preamble. In implementation, the detector may be configured to indicate sufficiently high correlation when the correlation magnitude is a greater than a threshold, greater than or equal to a threshold, or in the case where the correlation magnitude is inverted, less than a threshold, or less than or equal to a threshold. Similarly, the phrase term "below a threshold," or any variant thereof, is used throughout this disclosure merely to indicate that the correlation of the received signal is sufficiently low to indicate the possible presence of a packet preamble. In implementation, the detector may be configured to indicate sufficiently low correlation when the correlation magnitude is less than threshold, less than or equal to a threshold, or in the case where the correlation magnitude is inverted, greater than a threshold, or greater than or equal to a threshold. Those skilled in the art will be best suited to determine the appropriate polarities and thresholds depending on the particular application and overall design constraints.

Figure 4A:
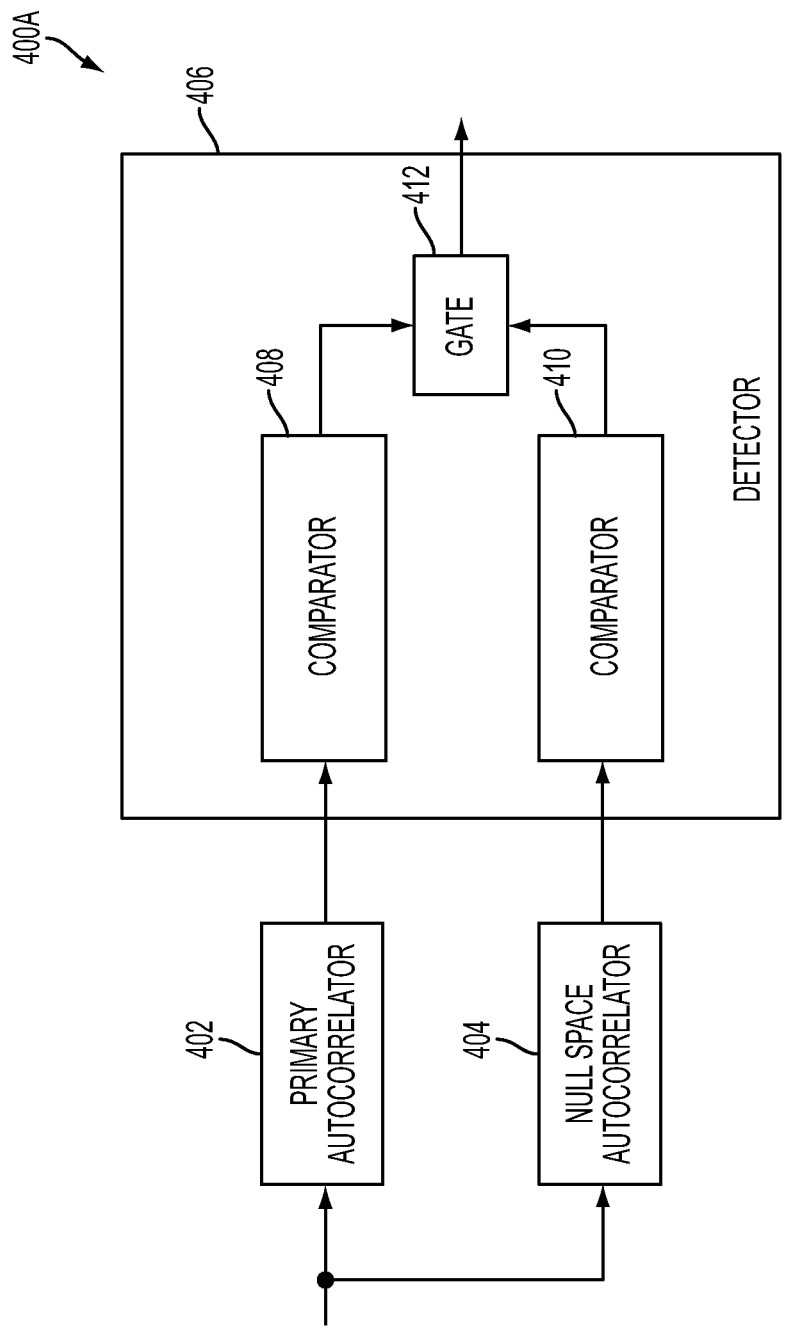
FIG. 4A is a schematic diagram illustrating one example of a packet detection module.

FIG. 4A is a schematic diagram illustrating one example of a packet detection module. The packet detection module 400A is shown with a primary autocorrelator 402, a null space autocorrelator 404, and a detector 406. The primary autocorrelator 402 is configured to detect the similarity between a repetitive sequence comprising the ten repeated STF short symbols contained in the preamble of the data packet. This may be achieved by setting the time delay of the primary autocorrelator 402 to the repetition interval of the STF short symbols, which in this case is 0.8 μs. To account for the variation in the received power, the correlator output may be normalized with the received power over the same interval. With this configuration, the primary autocorrelator 402 will produce a correlator output that peaks at the beginning of each data packet where the preamble is located. The magnitude of the correlator output may then be compared to a correlation threshold by a comparator 408 in the detector 406 and a primary decision flag set when the output exceeds the correlation threshold. The algorithm for this process may be written as:

$$\frac{\sum_{m=0}^{M-1} x^*_{i+m} x_{i+m+M}}{\sum_{m=0}^{2M-1} |x_{i+m}|^2} > \tau \qquad \text{Equation 1}$$

where, $x_i$ is the latest digital baseband complex (IQ) sample and $\tau$ is the threshold with the summation being carried over length M. M is defined based on the repetition interval of the STF short symbols.

The primary autocorrelator 402 does not discriminate based on the shape of the waveform. Any waveform that is periodic may trigger the primary autocorrelator 402 as long as it meets the threshold criterion described above. The null space autocorrelator 404 may be used to avoid false alarm resulting from narrow band interferers in the form of one or two tone inputs. The null space autocorrelator 404 takes advantage of the additional dimensions in the STF and validates the hypotheses generated by the primary autocorrelator 402. The additional dimensions that are used are orthogonal to the dimensions used in the primary autocorrelator 402. Due to the sequence properties of the STF, these orthogonal projections provide the ability to distinguish valid data packets form single and two tone interferers.

True orthogonal projection, on the entire STF space, increases the complexity of the autocorrelator since it would need the ability to precisely track wrap around points. To reduce this complexity, a partial orthogonal projection may be used. Such partial orthogonal projection can be shown to have very little loss in performance while providing very good discrimination capability.

The null space autocorrelator 404 may be configured to project in an orthogonal dimension to the primary autocorrelator 402. This may be achieved by setting the time delay of the null space autocorrelator 404 to a time shorter than the repetition interval of the STF short symbols. Preferably, the time delay is set to the interval that results in the correlation magnitude of the null space autocorrelator 404 being at substantially the lowest autocorrelation magnitude for the STF. The correlator output from the null space autocorrelation 404 may be normalized with the received power over the same interval to account for the variation in the received power. The magnitude of the correlator output may then be compared to a null space threshold by a comparator 410 in the detector 406 and a null space decision flag set when the output is below the null space threshold. The algorithm for this process may be written as:

$$\frac{\sum_{m=0}^{M-N-1} x^*_{i+m} x_{i+m+M}}{\sum_{m=0}^{2(M-N)-1} |x_{i+m}|^2} < \tau_{NSD} \qquad \text{Equation 2}$$

where, M is the repetition length of the STF short symbol, N is the offset between the full repetition interval of the short symbols and the partial null space interval, and $\tau_{NSD}$ is the null space threshold.

The detector 406 also includes a gate 412. The gate 412 is used to indicate when valid data packets arrive at the receive node. In this example, the gate 412 performs an "and" function and provides a valid data packet indicator when both decision flags from the comparators 408, 410 are set. That is, the detector 406 provides an indication that a valid data packet has been received when the magnitude of the output from the primary autocorelator 402 exceeds the correlation threshold and the magnitude of the output from the null space autocorelator 404 is below the null space threshold.

The null space autocorrelator 404 will reject single tone interferers and most two tone interferes. However, there are some two tone interferer combinations that create beat frequencies which may fall within the null space and hence meet the conditions in Equation (2). In order to avoid such cases, another null space autocorrelator may be added with a different time delay.

Figure 4B:
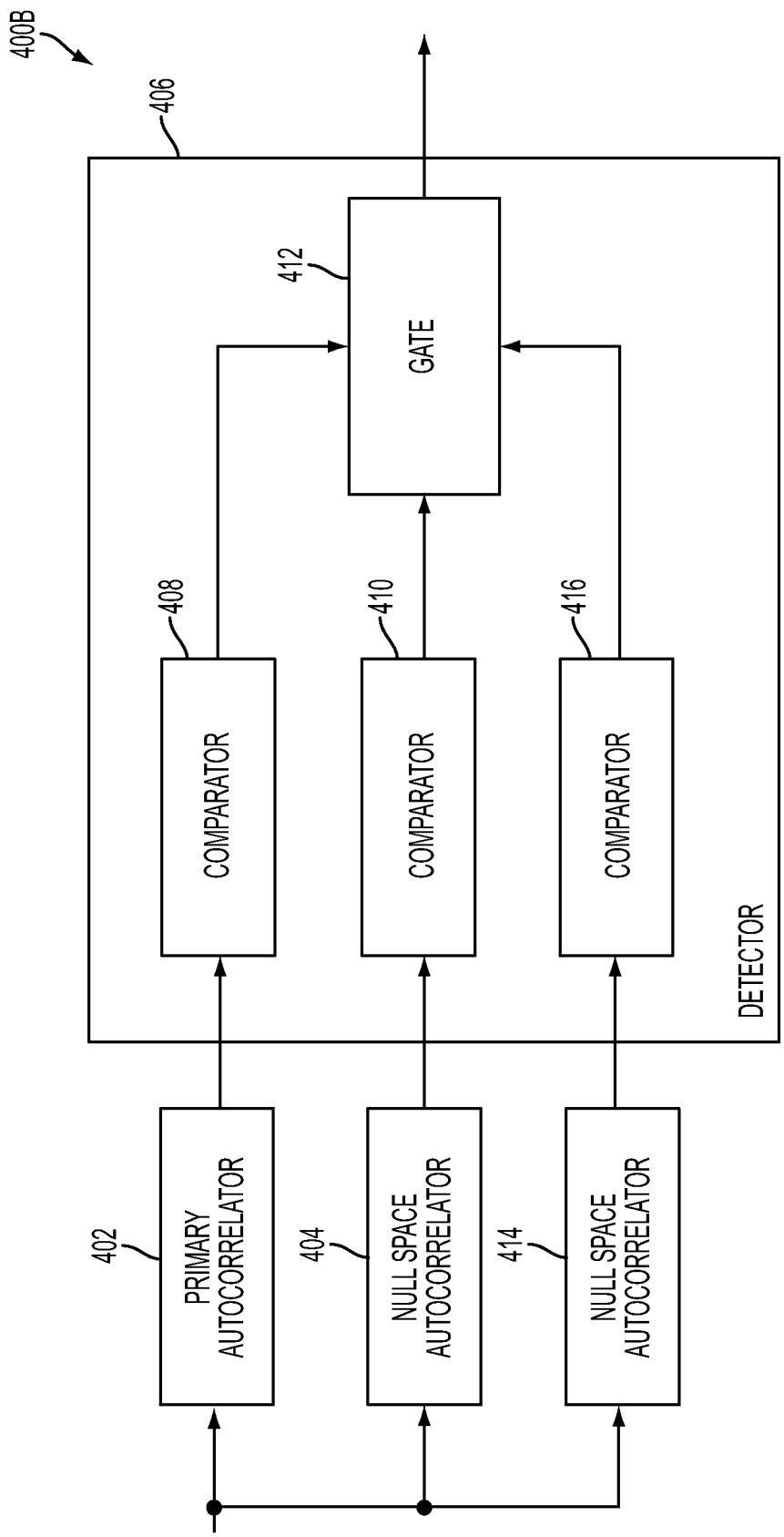
FIG. 4B is a schematic diagram illustrating another example of a packet detection module.

FIG. 4B is a schematic diagram illustrating another example of a packet detection module with an additional null space autocorrelator. The additional null space autocorrelator 414 is used to qualify the outputs from the primary and null space autocorrelators 402, 404 described in connection with FIG. 4A. The time delay of the additional null space autocorrelator 414 may be set to an interval shorter than the repetition interval of the STF short symbols, but different from the time delay setting of the other null space autocorrelator 404. Preferably, the time delay is set to the interval that results in the correlation magnitude of the null space autocorrelator 404 being at substantially the second lowest autocorrelation magnitude for the STF. The correlator output from the additional null space autocorrelator 414 may be normalized with the received power over the same interval to account for the variation in the received power. With this configuration, the additional null space autocorrelator 414 will also produce a null at the beginning of each data packet where the preamble is located. The magnitude of the correlator output may then be compared to a null space threshold by a comparator 416 in the detector 406 and a null space decision flag set when the output is below the null space threshold.

As explained earlier, the gate 412 is used to indicate when valid data packet arrive at the receive node. In this example, the gate 412 performs an "and" function and provides a valid data packet indicator when all three decision flags from the comparators 408, 410, 416 are set. That is, the detector 406 provides an indication that a valid data packet has been received when the magnitude of the output from the primary autocorrelator 402 exceeds the correlation threshold and the magnitudes of the outputs from the null space autocorrelators 404, 414 are below their respective null space thresholds.

Figure 4C:
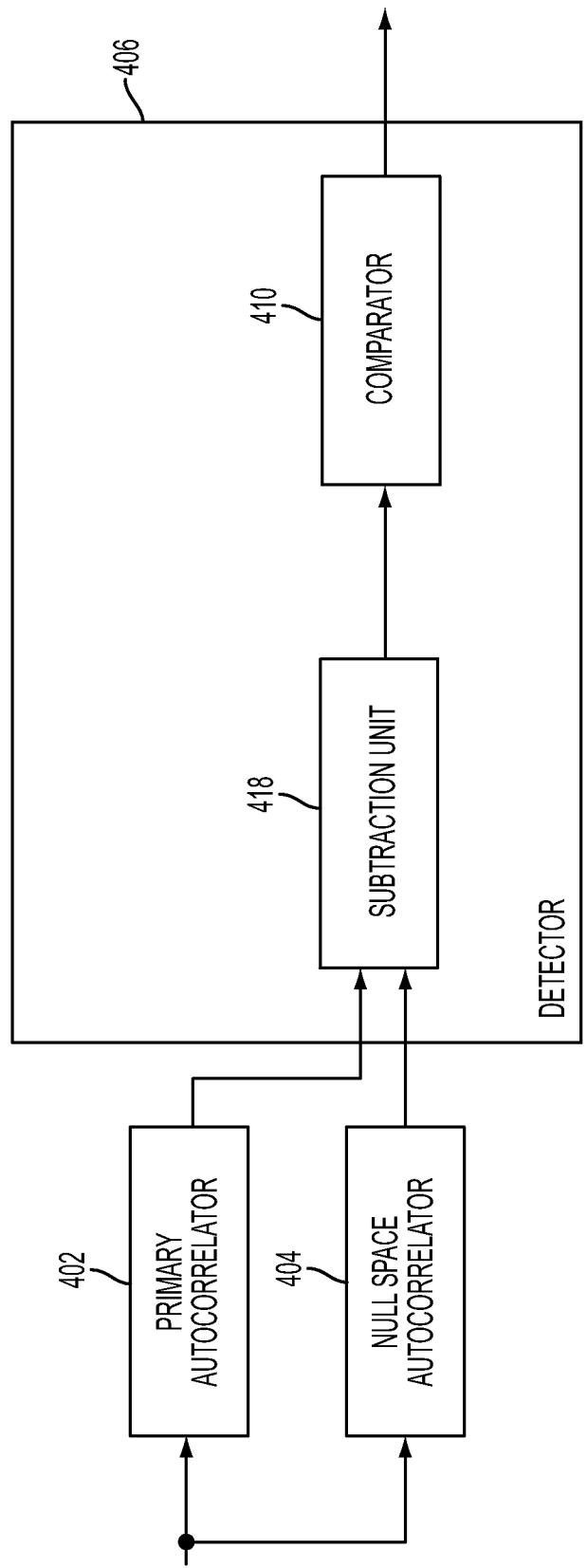
FIG. 4C is a schematic diagram illustrating yet another example of a packet detection module.

FIG. 4C is a schematic diagram illustrating another example of a packet detection module. In this example, the primary decision flag is set in the same manner as described earlier in connection with FIG. 4A. That is, the primary autocorrelator 402 is set with a time delay equal to the repetition interval of the STF short symbols and produces a correlator output that peaks at the beginning of each data packet where the preamble is located.

The null space autocorrelator 404 also operates in the same manner as described earlier in connection with FIG. 4A with the time delay different than the repetition interval of the STF short symbols, preferably at an interval that results in the correlation output of the null space autocorrelator 404 being at substantially the lowest autocorrelation output for the STF. However, in this example, the packet decision metric is a function of the difference between the magnitudes of the correlation outputs from the autocorrelators 402, 404. Specifically, a subtraction unit 418 is used to compute the difference between the magnitude of the correlator output from primary autocorrelator 402 and the magnitude of the correlator output from the null space autocorrelator 404. The computed difference output from the subtraction unit 418 may then be compared to a threshold by the comparator 410 in the detector 406 and a decision flag set when the output is above the threshold.

The detector 406 is the same as described earlier in connection with FIG. 4A. The gate 412 performs an "and" function and provides a valid data packet indicator when both decision flags from the comparators 408, 410 are set.

Figure 4D:
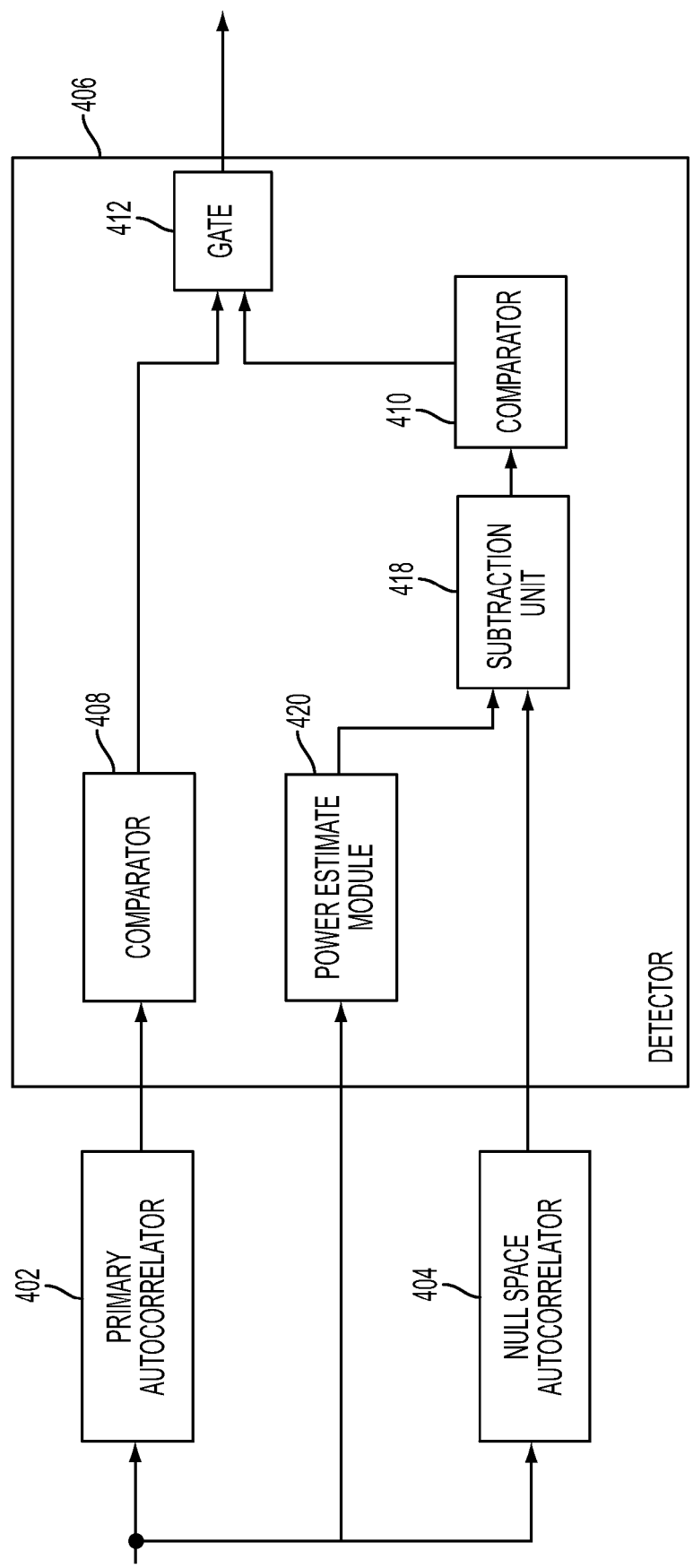
FIG. 4D is a schematic diagram illustrating a further example of a packet detection module.

FIG. 4D is a schematic diagram illustrating yet another example of a packet detection module. In this example, the primary decision flag is set in the same manner as described earlier in connection with FIG. 4A. That is, the primary autocorrelator 402 is set with a time delay equal to the repetition interval of the STF short symbols and produces a correlator output that peaks at the beginning of each data packet where the preamble is located. The primary decision flag is then set when the magnitude of the correlator output exceeds the correlation threshold.

The null space autocorrelator 404 also operates in the same manner as described earlier in connection with FIG. 4A with the time delay shorter than the repetition interval of the STF short symbols, preferably at an interval that results in the correlation output of the null space autocorrelator 404 being at substantially the lowest autocorrelation output for the STF. However, in this example, the null space decision flag is a function of the difference between the estimated power of the received signal and the magnitude of the correlation output from the null space autocorrelator 404. A power estimate module 420 may provide a means for estimating the power of the received signal. The power may be estimated in the digital domain, but alternatively it could be measured in the analog domain at the receiver. By way of example, the power estimate module 420 may be configured to sum the squares of the real and imaginary components of the signal and accumulate the result over the repetition interval of the STF short symbols. A subtraction unit 418 may be used to compute the difference between the estimated signal power and the magnitude of the correlator output from the null space autocorrelator 404. The computed difference output from the subtraction unit 418 may then be compared to a null space threshold by the comparator 410 in the detector 406 and a null space decision flag set when the output is above the null space threshold.

The detector 406 is the same as described earlier in connection with FIG. 4A. The gate 412 performs an "and" function and provides a valid data packet indicator when both decision flags from the comparators 408, 410 are set.

Figure 5:
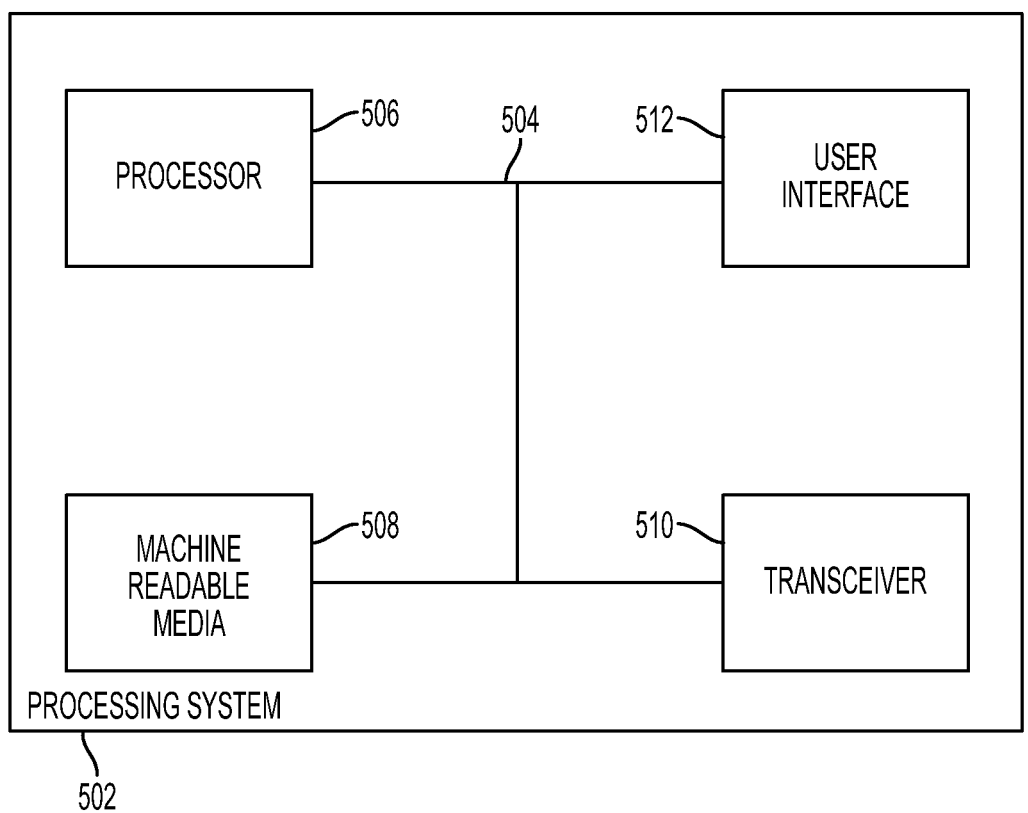
FIG. 5 is a schematic representation illustrating an example of a hardware configuration for wireless node.

FIG. 5 is a schematic representation illustrating an example of a hardware configuration for wireless node. In this example, a processing system 502 may be implemented with a bus architecture represented generally by bus 504. The bus 504 may include any number of interconnecting buses and bridges depending on the specific application of the processing system 502 and the overall design constraints. The bus links together various circuits including a processor 506, machine-readable media 508, a transceiver 510, and in the case of an access point, a user interface 512. The bus 504 may also link various other circuits such as timing sources, peripherals, voltage regulators, power management circuits, and the like, which are well known in the art, and therefore, will not be described any further.

The processor 506 is responsible for managing the bus and general processing, including the execution of software stored on the machine-readable media 508. The processor 506 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor 506 may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by a processor. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

In the hardware implementation illustrated in FIG. 5, the machine-readable media 508 is shown as part of the processing system 502 separate from the processor 506. However, as those skilled in the art will readily appreciate, the machine-readable media 508, or any portion thereof, may be external to the processing system 506 or the wireless node. Alternatively, or in addition to, the machine readable media 508, or any portion thereof, may be integrated into the processor 506, such as the case may be with cache and/or general register files.

The processing system 502 may be configured as a general-purpose processing system with one or more microprocessors providing the processor functionality and external memory providing at least a portion of the machine-readable media 506, all linked together with other supporting circuitry through an external bus architecture. Alternatively, the processing system 502 may be implemented with an ASIC (Application Specific Integrated Circuit) with the processor 506, supporting circuitry (not shown), and at least a portion of the machine-readable media 508 integrated into a single chip.

The machine-readable media 508 may be used to store a number of software modules. The software modules include instructions that when executed by the processor 506 cause the processing system to become a special purpose processing system that performs various functions presented throughout this disclosure. Each software module may reside in a single storage device or distributed across multiple memory devices. By way of example, a software module may be loaded into RAM from a hard drive when a triggering event occurs. During execution of the software module, the processor 506 may load some of the instructions into cache to increase access speed. One or more cache lines may then be loaded into a general register file for execution by the processor 506. When referring to the functionality of a software module below, it will be understood that such functionality is implemented by the processor 506 when executing instructions from that software module.

Figure 6A:
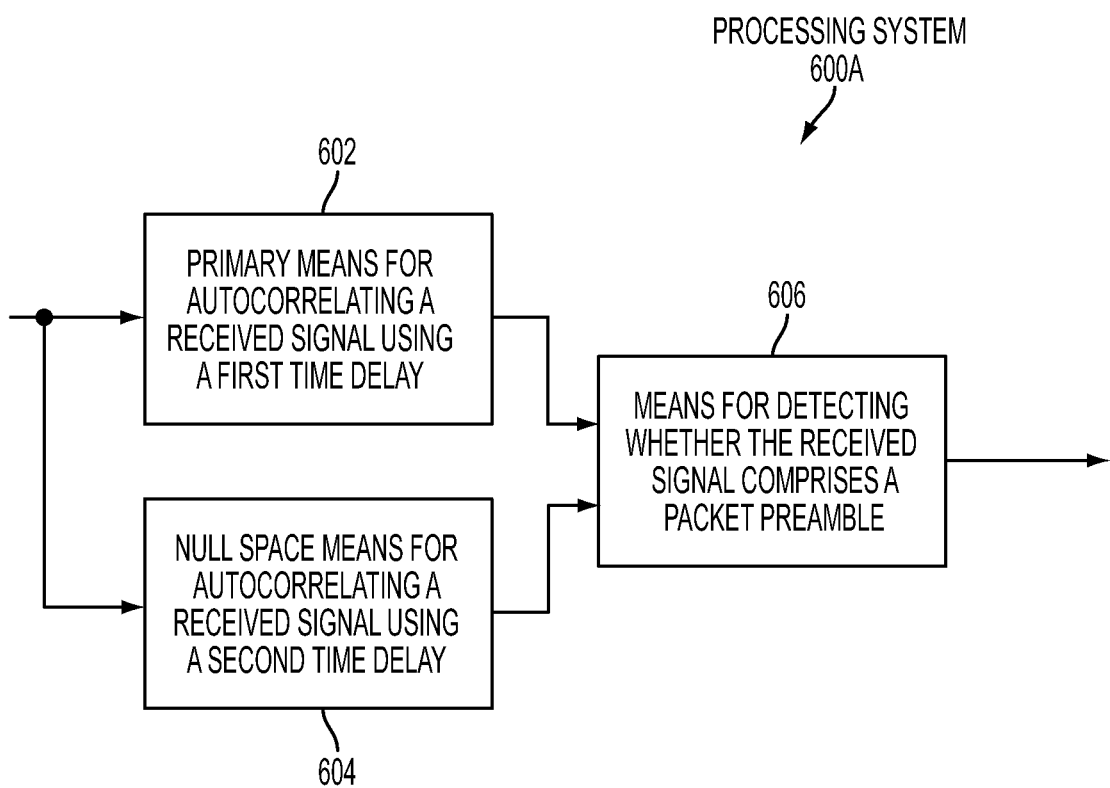
FIG. 6A is a functional block diagram illustrating an example of the functionality of a processing system for a wireless node.

In one embodiment of a wireless node, the data packet detection module 358 (see FIG. 3) may be implemented by the processing system with the processor programmed with instructions contained in a software module on the machine-readable media. FIG. 6A is a functional block diagram illustrating an example of the functionality of such processing system. The processing system 600 includes a primary means 602 for autocorrelating a received signal using a first time delay to produce a first correlation magnitude, a null space means 604 for autocorrelating the received signal using a second time delay different from the first time delay to produce a second correlation magnitude, and a 606 means for determining whether the received signal comprises a packet preamble. This determination is based on the first and second correlation magnitudes.

Figure 6B:
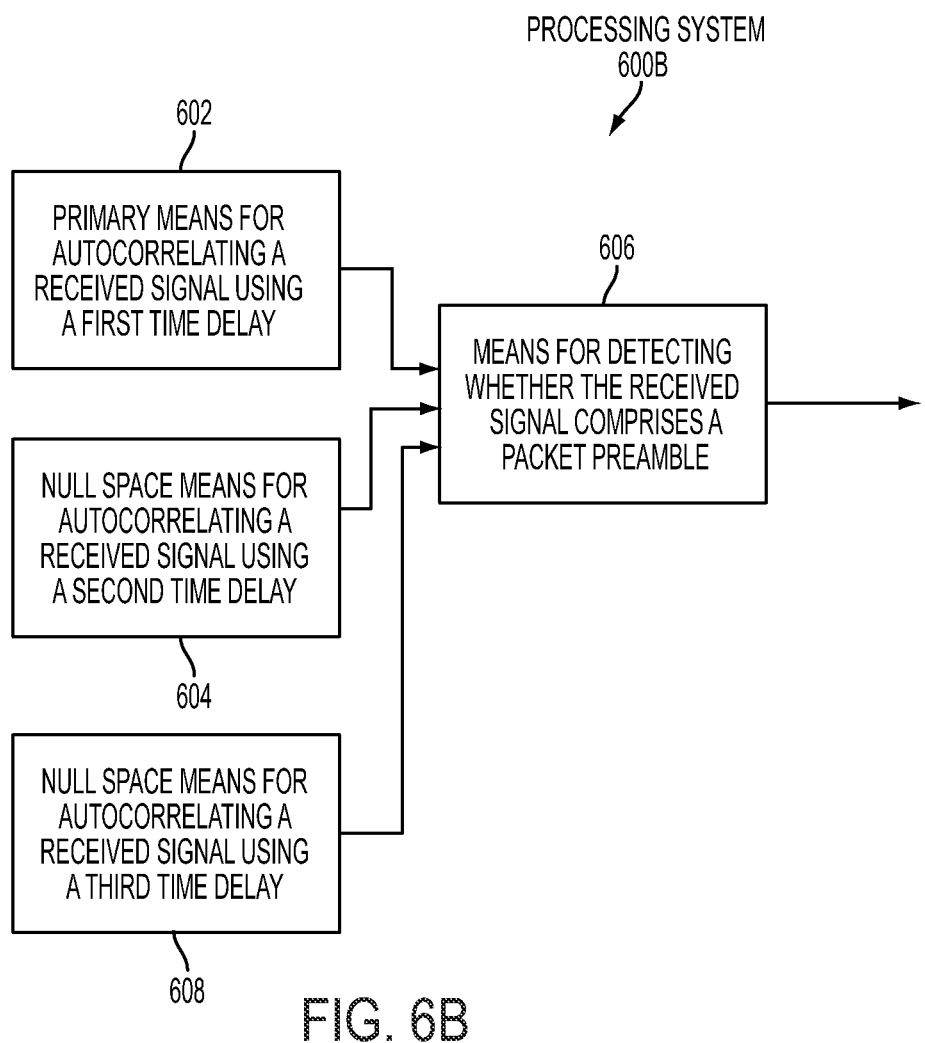
FIG. 6B is a functional block diagram illustrating another example of the functionality of a processing system in a wireless node.

FIG. 6B is a functional block diagram illustrating another example of the functionality of the processing system when the processor is programmed with instructions contained in a software module on the machine-readable media. In this example, the processing system builds on the functionality described in connection with FIG. 6A. In addition to those functions, the processing system 600B includes an additional null space means 608 for autocorrelating the received signal using a third time delay different from each of the first and second time delays to produce a third correlation magnitude. In this example, the means 606 for determining whether the received signal comprises a packet preamble is based on the first, second, and third correlation magnitudes.

Figure 7A:
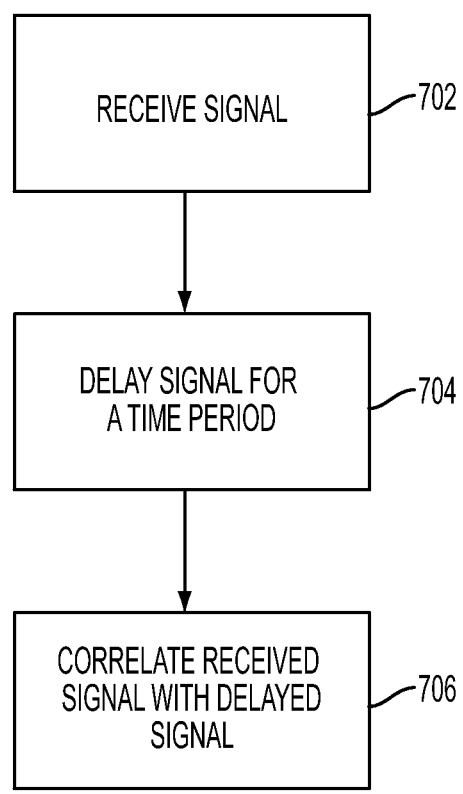
FIG. 7A is a flow chart illustrating an example of the algorithm implemented by a processing system to provide certain functionality.

FIG. 7A is a flow chart illustrating an example of the algorithm implemented by the processing system to provide a means for autocorrelating a received signal using a specified time delay to produce a correlation magnitude. Initially, in block 702, the signal is received from the receiver 354 (see FIG. 3) or elsewhere. The received signal is delayed for a specified time period in block 704. In block 706, the received signal is correlated with the delayed signal to produce the correlation magnitude.

This algorithm may be used to implement the primary autocorrelator, as well as both null space autocorrelators, simply by changing the specified time period in block 704. This allows various hardware components like tapped delay lines to be shared which further reduces implementation complexity. By way of example, the same tapped delay line may be used to implement all three autocorrelators with a variable stored in the machine-readable media to set the appropriate time period for the particular autocorrelation process being run.

Figure 7B:
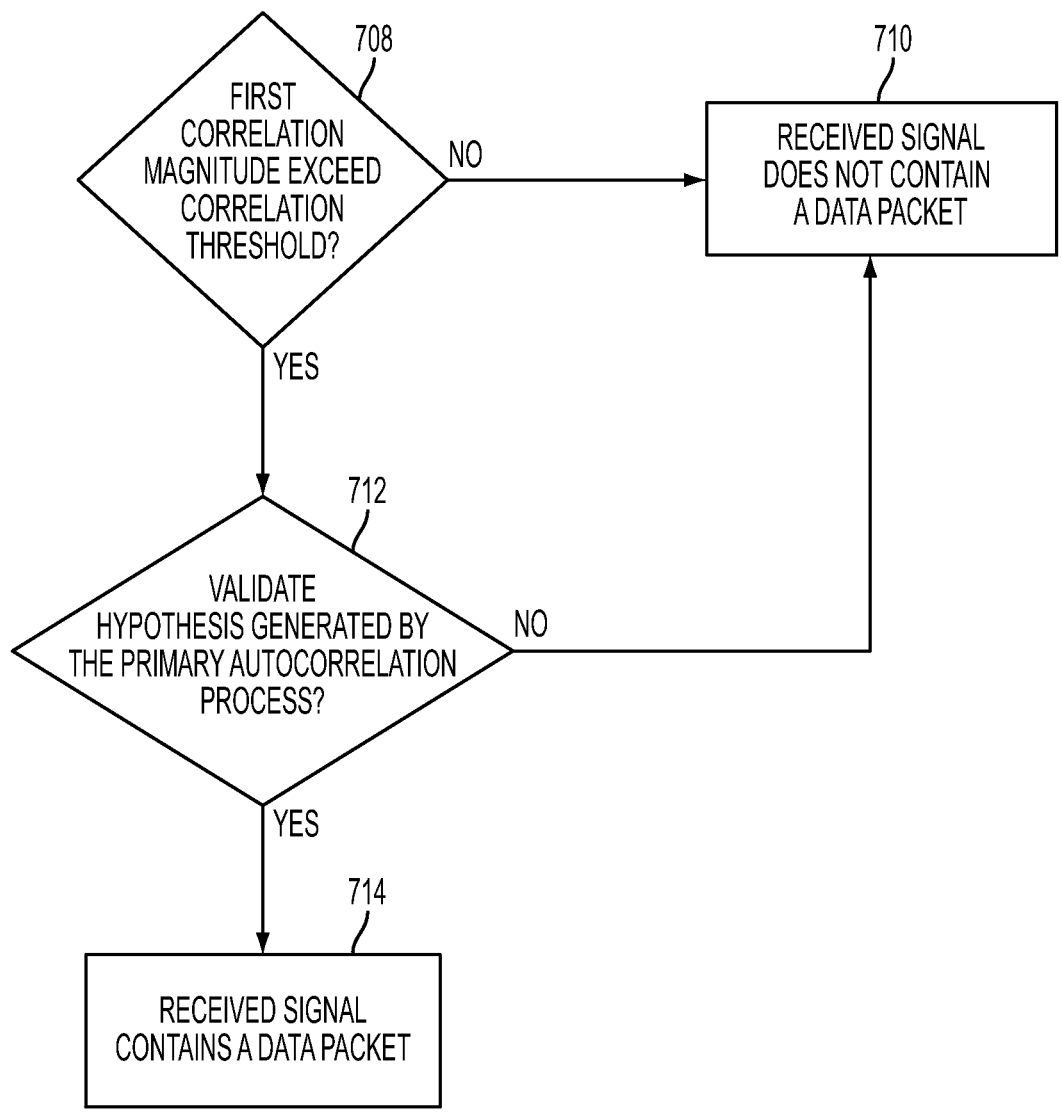
FIG. 7B is a flow chart illustrating an example of the algorithm implemented by a processing system to provide further functionality.

FIG. 7B is a flow chart illustrating an example of the algorithm implemented by the processing system to provide the means for determining whether the received signal comprises a packet preamble. In block 708, the algorithm determines whether the first correlation magnitude produced by the primary autocorrelation process exceeds a correlation threshold. If the first correlation magnitude is below the correlation threshold, then the algorithm determines that received signal does not contain a data packet in block 710. If, on the other hand, the first correlation magnitude exceeds the correlation threshold, the algorithm determines that the received signal potentially contains a data packet and proceeds to block 712. At block 712, the algorithm validates the hypotheses generated by the primary autocorrelation process. This may be achieved in a number of ways. By way of example, the algorithm determines that the received signal contains a valid data packet at block 714 if the second correlation magnitude is below a null space threshold, or if the difference between the first and second correlation magnitudes exceeds a null space threshold, or if the difference between the estimated power of the received signal and the second correlation magnitude exceeds a null space threshold. Alternatively, in embodiments of the packet detection module employing an additional null space autocorrelation process, the algorithm determines that the received signal contains a valid data packet at block 714 if both the second and third correlation magnitudes are below their respective null space threshold. If, on the other hand, the hypothesis generated by the primary autocorrelation process cannot be validated, then the algorithm determines that the received signal does not contain a data packet in block 710.

Figure 8:
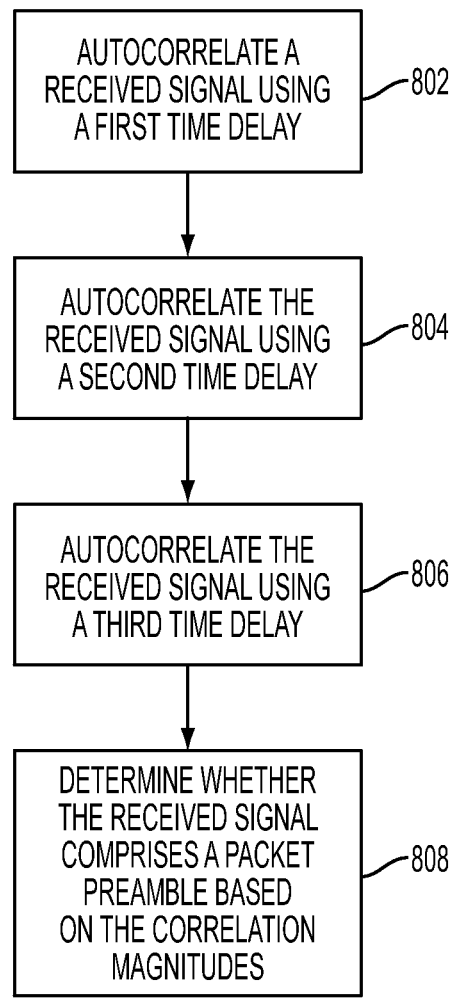
FIG. 8 is a flow chart illustrating an example of a method of data packet detection in a receiving node in a wireless network.

FIG. 8 is a flow chart illustrating an example of a method of signal processing, of more specifically, data packet detection in a receiving node in a wireless network. In block 802, a received signal is autocorrelated using a first time delay to produce a first correlation magnitude. In block 804, the received signal is autocorrelated using a second time delay different from the first time delay to produce a second correlation magnitude. In block 806, which is optional, the received signal is autocorrelated using a third time delay different from both the first and second time delays to produce a third correlation magnitude. In block 808, it is determined whether the received signal comprises a packet preamble based on the correlation magnitudes.

It is understood that any specific order or hierarchy of steps described in the context of a software module is being presented to provide an examples of a wireless node. Based upon design preferences, it is understood that the specific order or hierarchy of steps may be rearranged while remaining within the scope of the disclosure.

Whether the data packet detection module is implemented in hardware, software, or a combination thereof will depend upon the particular application and design constraints imposed on the overall system. Skilled artisans may implement the described functionality in varying ways for each particular application, but such implementation decisions should not be interpreted as causing a departure from the scope of the disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but are to be accorded the full scope consistent with the language of claims. The term "apparatus" shall be construed broadly to mean any wireless node (e.g., access point, access terminal, etc.), or any block, module, component, circuit, part, or the like, or any combination thereof used in a wireless node. The term "method" shall similarly be construed broadly to mean the operation of a wireless node, or any step, process, algorithm, or the like, or any combination thereof performed by a wireless node. Reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An apparatus for signal processing, comprising:
   a first autocorrelator configured to autocorrelate a received signal using a first time delay to produce a first correlation magnitude;
   a second autocorrelator configured to autocorrelate the received signal using a second time delay different from the first time delay to produce a second correlation magnitude for detecting null space or tone interferers; and
   a detector configured to determine whether the received signal comprises null space or tone interferers based on the second correlation magnitude and to determine whether the received signal comprises a packet preamble based on the first and second correlation magnitudes and based on if the received signal comprises null space or tone interferers, wherein at least a portion of the packet preamble comprises a repetitive sequence of a short training field, and the second autocorrelator is configured to autocorrelate the received signal using the second time delay that is less than a repetition interval of the repetitive sequence of the short training field.

2. The apparatus of claim 1, wherein the first time delay is substantially equal to the repetition interval of the repetitive sequence of the short training field.

3. The apparatus of claim 1, wherein the second time delay is equal to an interval that results in the second correlation magnitude being at substantially a lowest autocorrelation magnitude for the repetitive sequence of the short training field.

4. The apparatus of claim 1, further comprising a third autocorrelator configured to autocorrelate the received signal using a third time delay different from each of the first and second time delays to produce a third correlation magnitude, and wherein the detector is further configured to determine whether the received signal comprises the packet preamble based on the first, second and third correlation magnitudes.

5. The apparatus of claim 4, wherein the detector is further configured to determine whether the received signal comprises the packet preamble by comparing the first correlation magnitude to a first threshold, comparing the second correlation magnitude to a second threshold, and comparing the third correlation magnitude to a third threshold.

6. The apparatus of claim 1, wherein the detector is further configured to determine whether the received signal comprises the packet preamble by comparing a difference between the first and second correlation magnitudes to a threshold.

7. The apparatus of claim 1, further comprising a power estimate module configured to estimate power of the received signal, and wherein the detector is further configured to determine whether the received signal comprises the packet preamble by comparing the first correlation magnitude to a first threshold, and comparing a difference between the estimated power of the received signal and the second correlation magnitude to a second threshold.

8. The apparatus of claim 1, wherein the detector is further configured to determine whether the received signal comprises the packet preamble by comparing the first correlation magnitude to a first threshold and comparing the second correlation magnitude to a second threshold.

9. An apparatus for signal processing, comprising:
means for autocorrelating a received signal using a first time delay to produce a first correlation magnitude;
means for autocorrelating the received signal using a second time delay different from the first time delay to produce a second correlation magnitude for detecting null space or tone interferers;
means for determining whether the received signal comprises null space or tone interferers based on the second correlation magnitude; and
means for determining whether the received signal comprises a packet preamble based on the first and second correlation magnitudes and based on if the received signal comprises null space or tone interferers, wherein at least a portion of the packet preamble comprises a repetitive sequence of a short training field, and the means for autocorrelating the received signal using the second time delay is configured to autocorrelate the received signal using the second time delay that is less than a repetition interval of the repetitive sequence of the short training field.

10. The apparatus of claim 9, wherein the first time delay is substantially equal to the repetition interval of the repetitive sequence of the short training field.

11. The apparatus of claim 9, wherein the second time delay is equal to an interval that results in the second correlation magnitude being substantially a lowest autocorrelation magnitude for the repetitive sequence of the short training field.

12. The apparatus of claim 9, further comprising means for autocorrelating the received signal using a third time delay different from each of the first and second time delays to produce a third correlation magnitude, and wherein the means for determining whether the received signal comprises the packet preamble is further configured to determine whether the received signal comprises the packet preamble based on the first, second and third correlation magnitudes.

13. The apparatus of claim 12, wherein the means for determining whether the received signal comprises the packet preamble is further configured to determine whether the received signal comprises the packet preamble by comparing the first correlation magnitude to a first threshold, comparing the second correlation magnitude to a second threshold, and comparing the third correlation magnitude to a third threshold.

14. The apparatus of claim 9, wherein the means for determining whether the received signal comprises the packet preamble is further configured to determine whether the received signal comprises the packet preamble by comparing a difference between the first and second correlation magnitudes to a threshold.

15. The apparatus of claim 9, further comprising means for estimating power of the received signal, wherein the means for determining whether the received signal comprises the packet preamble is further configured to determine whether the received signal comprises the packet preamble by comparing the first correlation magnitude to a first threshold, and comparing a difference between the estimated power of the received signal and the second correlation magnitude to a second threshold.

16. The apparatus claim 9, wherein the means for determining whether the received signal comprises the packet preamble is configured to determine whether the received signal comprises the packet preamble by comparing the first correlation magnitude to a first threshold and comparing the second correlation magnitude to a second threshold.

17. A method of signal processing, comprising:
autocorrelating a received signal using a first time delay to produce a first correlation magnitude;
autocorrelating the received signal using a second time delay different from the first time delay to produce a second correlation magnitude for detecting null space or tone interferers;
determining whether the received signal comprises null space or tone interferers based on the second correlation magnitude; and
determining whether the received signal comprises a packet preamble based on the first and second correlation magnitudes and based on if the received signal comprises null space or tone interferers, wherein at least a portion of the packet preamble comprises a repetitive sequence of a short training field, and the autocorrelation of the received signal using the second time delay is based on the second time delay being less than a repetition interval of the repetitive sequence of the short training field.

18. The method of claim 17, wherein the first time delay is substantially equal to a repetition interval of the repetitive sequence of the short training field.

19. The method of claim 17, wherein the second time delay is equal to an interval that results in the second correlation magnitude being at substantially a lowest autocorrelation magnitude for the repetitive sequence of the short training field.

20. The method of claim 17, further comprising autocorrelating the received signal using a third time delay different from each of the first and second time delays to produce a third correlation magnitude, and wherein the determining of whether the received signal comprises the packet preamble further comprises determining whether the received signal comprises the packet preamble based on the first, second and third correlation magnitudes.

21. The method of claim 20, wherein the determining of whether the received signal comprises the packet preamble further comprises comparing the third correlation magnitude to a third threshold.

22. The method of claim 17, wherein the determining of whether the received signal comprises the packet preamble further comprises comparing a difference between the first and second correlation magnitudes to a threshold.

23. The method of claim 17, further comprising estimating power of the received signal, wherein the determining of whether the received signal comprises the packet preamble further comprises comparing a difference between the estimated power of the received signal and the second correlation magnitude to a second threshold.

24. The method of claim 17, wherein the determining of whether the received signal comprises the packet preamble comprises comparing the first correlation magnitude to a first threshold and comparing the second correlation magnitude to a second threshold.

25. A non-transitory computer-readable medium storing code for signal processing that when executed by a processor causes the processor to:
- autocorrelate a received signal using a first time delay to produce a first correlation magnitude;
- autocorrelate the received signal using a second time delay different from the first time delay to produce a second correlation magnitude for detecting null space or tone interferers;
- determine whether the received signal comprises null space or tone interferers based on the second correlation magnitude; and
- determine whether the received signal comprises a packet preamble based on the first and second correlation magnitudes and based on if the received signal comprises null space or tone interferers, wherein at least a portion of the packet preamble comprises a repetitive sequence of a short training field, and the autocorrelation of the received signal using the second time delay is based on the second time delay being less than a repetition interval of the repetitive sequence of the short training field.

26. A wireless node, comprising:
a receiver configured to receive a signal; and
a processing system, comprising:
- a first autocorrelator configured to autocorrelate the received signal using a first time delay to produce a first correlation magnitude;
- a second autocorrelator configured to autocorrelate the received signal using a second time delay different from the first time delay to produce a second correlation magnitude for detecting null space or tone interferers; and
- a detector configured to determine whether the received signal comprises null space or tone interferers based on the second correlation magnitude and to determine whether the received signal comprises a packet preamble based on the first and second correlation magnitudes and based on if the received signal comprises null space or tone interferers, wherein at least a portion of the packet preamble comprises a repetitive sequence of a short training field, and the second autocorrelator is configured to autocorrelate the received signal using the second time delay that is less than a repetition interval of the repetitive sequence of the short training field.

* * * * *